UNITED STATES PATENT OFFICE.

STEPHEN TRONC, OF AVOCA, ILLINOIS.

MANUFACTURE OF ARTIFICIAL STONE.

SPECIFICATION forming part of Letters Patent No. 254,247, dated February 28, 1882.

Application filed January 3, 1882. (No specimens.)

*To all whom it may concern:*

Be it known that I, STEPHEN TRONC, of Avoca, in the county of Livingston and State of Illinois, have invented certain new and useful Improvements in the Manufacture of Artificial Stone; and I do hereby declare the following to be a full, clear, and exact description of the invention, such as will enable others skilled in the art to which it pertains to make and use the same.

My invention relates to an improvement in the manufacture of artificial stone; and it consists of a composition of certain ingredients combined in such a manner as to produce, when combined with pure silicious sand or gravel and Portland or other suitable cement, a hard crystallized material which is impervious to moisture, adapted to withstand the changes in any climate, and is unaffected by fire, thereby rendering it particularly applicable for buildings, sidewalks, monuments, and other purposes—such, for instance, as dams, cisterns, foundations for houses, cellar-floors, well-tubing, drains, sewer-pipe, &c., and for all purposes for which the best quality of natural stone is employed.

To enable others to understand and use my invention, I will describe the manner in which I have carried it out.

I take about five pounds of rye-flour, about two pounds of Geo. T. Lewis's lye, or a combination of caustic soda and soda-ash, or other suitable lye, and about ten pounds of common salt. The flour is first made into a thin cold paste, which is then placed over a fire and brought up to the boiling-point. The salt and lye are then dissolved in water, which latter is then added to the flour. The above compound is then thoroughly commingled and enough water added thereto to make forty gallons of solution.

The manner of applying my above solution to form artificial stone is as follows: About eight parts of pure silicious sand or gravel and about one part of Portland or other suitable cement are intimately mixed together, and enough of the before-described solution is added to reduce the whole to a thick paste, or to the consistency required for molding. The compound is then tamped or molded in the ordinary manner, and forms, when dry, an extremely hard and durable material, its particles adhering so tenaciously together as to form a stone well adapted for the numerous purposes before referred to.

I would have it understood that I do not limit myself to the exact proportions of the ingredients before described, but consider myself at liberty to combine them in any suitable proportion that will produce the desired result.

Having fully described my invention, what I claim as new, and desire to secure by Letters Patent, is—

1. The herein-described solution, consisting of water, rye-flour, Lewis's or any other lye, and common salt, combined in suitable proportion, for the purpose of producing the crystallization of the artificial stone, as specified.

2. An artificial stone composed of sand and cement moistened with a solution composed of water, rye-flour, Lewis's or any suitable lye, and common salt, substantially as set forth.

In testimony whereof I have signed this specification in the presence of two subscribing witnesses.

STEPHEN TRONC.

Witnesses:
L. J. STERLING,
W. H. VAN DOORN.